US007962799B2

(12) United States Patent
Lauer et al.

(10) Patent No.: US 7,962,799 B2
(45) Date of Patent: Jun. 14, 2011

(54) SYSTEM AND METHOD FOR SYNCHRONIZING TEST RUNS ON SEPARATE SYSTEMS

(75) Inventors: Michael Lauer, Zweibruecken (DE); Frank Reisenhofer, Mannheim (DE)

(73) Assignee: SAP AG, Walldorf (DE)

( * ) Notice: Subject to any disclaimer, the term of this patent is extended or adjusted under 35 U.S.C. 154(b) by 436 days.

(21) Appl. No.: 11/967,244

(22) Filed: Dec. 30, 2007

(65) Prior Publication Data

US 2009/0172473 A1 Jul. 2, 2009

(51) Int. Cl.
*G06F 17/30* (2006.01)
(52) U.S. Cl. ......... 714/38.1; 714/37; 709/248; 717/128; 717/149
(58) Field of Classification Search .............. 714/3, 387, 714/37, 38, 38.1
See application file for complete search history.

(56) References Cited

U.S. PATENT DOCUMENTS

| 6,611,955 | B1 * | 8/2003 | Logean et al. ............... 717/128 |
| 2003/0051188 | A1 * | 3/2003 | Patil ................................ 714/4 |
| 2003/0217308 | A1 * | 11/2003 | Volkov ........................... 714/38 |
| 2003/0236844 | A1 * | 12/2003 | Kaler et al. .................... 709/206 |
| 2004/0199571 | A1 * | 10/2004 | Spiegl et al. .................. 709/201 |
| 2005/0076195 | A1 * | 4/2005 | Fuller et al. ...................... 713/1 |
| 2005/0107990 | A1 * | 5/2005 | Monk et al. ................... 702/188 |
| 2006/0064399 | A1 * | 3/2006 | De Sio .............................. 707/1 |
| 2006/0206870 | A1 * | 9/2006 | Moulden et al. ............. 717/124 |
| 2006/0212759 | A1 * | 9/2006 | Campbell et al. ............... 714/38 |

* cited by examiner

*Primary Examiner* — Scott T Baderman
*Assistant Examiner* — Chae Ko
(74) *Attorney, Agent, or Firm* — Kenyon & Kenyon LLP

(57) ABSTRACT

A system and method provide for test automation of a process running on separated systems. The systems may be separated physically and/or logically separated. The system and method provide that all information required for a test run are made available on one system. In an embodiment, a central component is used to provide all required status and result information regarding the test status of every system in the test landscape. In further embodiment, an extension of the capabilities of existing test tools is made so that the test tool communicates with the central component via an appropriate protocol.

18 Claims, 3 Drawing Sheets

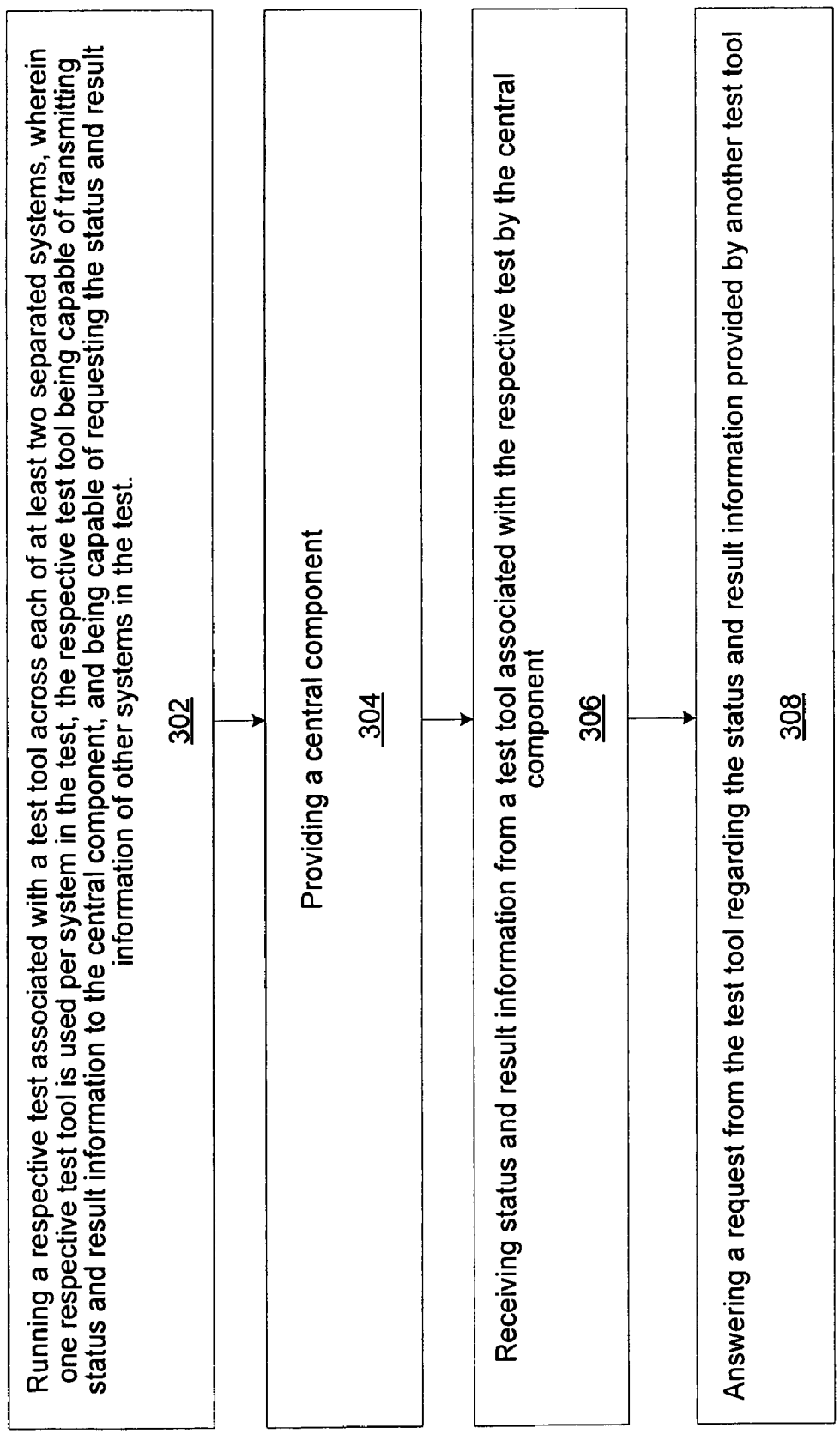

SYSTEM AND METHOD FOR SYNCHRONIZING TEST RUNS ON SEPARATE SYSTEMS

BACKGROUND

Businesses rely on software applications which handle various functions from financials to management of resources. However, such software applications need to tested to ensure that software applications are running properly.

To assist in testing the software applications, automated test tools were developed. These automated test tools may work fine in some systems, but do not render trustworthy results in other systems. For example, in a situation where there are multiple client systems engaging in a process, each of the client systems may take a different path from the other. In such a path, each client system executes single or multiple process steps. However, in such a situation where the client systems are physically and logically separate and distinct from each other, a complete test automation of a process running on such client systems has not been feasibly possible.

In other existing situations, a load test tool is provided that uses rendezvous points to submit the execution of load test scripts until a certain number of users have reached a specified point in the process of the load test. This tool provides that its controller pauses each script on a previously-defined point until a certain number of scripts within the test has reach this point. The load test tool is not designed for functional testing of applications.

Accordingly, a need exists to provide a complete test automation of a process running on separated systems, and a need exists to allow for functional testing of the process in such a situation.

BRIEF DESCRIPTION OF THE DRAWINGS

FIG. 3 shows a flow chart of an embodiment according to the present invention.

DETAILED DESCRIPTION

Embodiments of the present invention provide a system and method for testing, automatic or otherwise, a process running on separated systems. The separated systems may be physically separate and/or logically separate.

A process can be separated into multiple process steps. That process is to be tested using a test automation. However, the process flow may be designed in such a way that single or multiple process steps are executed on different systems. These different systems may be separate physically and logically. While an overall sequence may describe the execution order of the process steps, within this sequence, certain process steps may be executed in an asynchronous and parallel manner by executing them simultaneously or overlapping on separated systems.

During this process execution, at least two types of dependencies exist between the process steps running on the distributed and separated systems: time-based dependencies and functional dependencies. Time-based dependencies has an effect such that, for example, the execution of a subsequent process step can only take place if the execution of one or more earlier process steps on one or more systems has been completed. Functional dependencies has an effect such that, for example, the result values or status information of one or more process steps that have been executed on one or more different systems have to be used as an input value for one or more subsequent process steps being executed on one or more systems different from the previous ones.

In order to run an automated test on a process, a testscript of an automated test tool may be executed on every system participating in the process. Thus, one instance of the test automation tool is being processed on every system the hosts a process step. This current automated test tool can only use the address range of the physical system on which it is executed. Therefore, when executing a test case, the currently available test tool has no knowledge about the status of process steps taking place on other systems than its own. This test tool also has no knowledge about the result and status values which may exist on other systems taking part in the test process.

Figure 1:
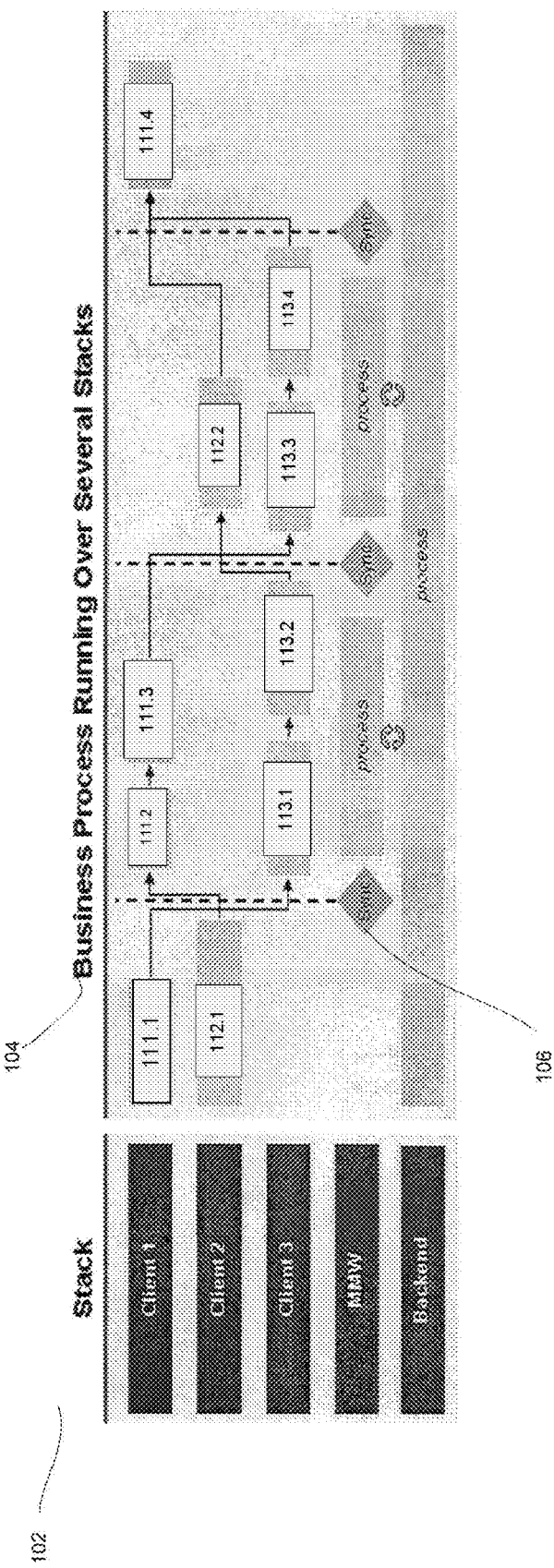
FIG. 1 shows a flow diagram of the distributed execution of a business process.

FIG. 1 shows an example flow diagram of separate clients 1, 2, 3, among others, which run through multiple business process steps. The components displayed under the header "Stack" 102 are physically separated systems. The client 1, client 2, and client 3 each contains a version of the business logic and executes one or more steps within the business process 104. Client 1, client 2, and client 3, can only communicate with the Mobile Middle Ware (MMW) by using a synchronization process. Thus, for the limited time of a synchronization 106 between the client and the MMW, a communication between the client and the MMW is established.

The Mobile Middle Ware (MMW) has communication logic for the data exchange between the client and an associated backend system, as well as between the client and another client via the backend system. In this example, the connection between the MMW and the backend system is a permanent connection. The connection between the MMW and the client is a non-permanent connection. The lifetime of the connection between the MMW and the client is limited to the time of the synchronization, as discussed here. The MMW serves as a message destination for all messages coming from the client. The MMW also serves as a message source for all messages going to the client. The MMW has distribution rules which define the delivery of data specific to each client. However, the MMW does not necessarily have all information about the status of each client.

The backend system is a data-containing system. The backend system and the MMW may be run on separate systems, or on the same system.

A business process, such as the example shown in FIG. 1, is executed by running the process steps on all systems taking part. As per FIG. 1, client 1 is shown executing the business process in a total of four process steps, i.e., step 111.1 to step 111.4. Client 2 is shown executing the business process in a total of two process steps, i.e., step 112.1 to step 112.2. Client 3 is shown executing the business process in a total of four steps, i.e., step 113.1 to step 113.4. Within this flow diagram, the following dependencies are observed. First, for example, step 111.2 on client 1 can only begin after step 112.1 on client 2 has finished and client 2 has completed synchronization with the MMW. Second, for example, step 113.1 on client 3 can only begin after step 111.1 on client 1 has finished and client 1 has completed synchronization with the MMW. Third, for example, step 112.2 on client 2 can only begin after step 113.2 on client 3 has finished and client 3 has completed synchronization with the MMW. Fourth, for example, step 113.3 on client 3 can only begin after step 111.3 on client 1 has finished and client 1 has completed synchronization with the MMW. Fifth, for example, step 111.4 on client 1 can only begin after step 112.2 on client 2 and step 113.4 on client 3 have finished and both clients 2 and 3 have completed synchronization with the MMW.

In this situation, an instance of the test automation tool may be run on every client in order to execute a test script which contains a sequence of interactions with the client appropriate which are necessary to execute the process steps which should take place on the client. However, as mentioned above, due to the physical and logical separation of the systems within the test landscape, the automated execution will fail each time when the process flow crosses a system border. Embodiments of the present invention solve this deficiency so that the automated execution of the test succeeds even when the process flow "crosses a system border."

Embodiments of the present invention provide that all information required for the test run are made available on one system. This set of information must include the status values of each process step as well as the result values of already finished process steps from all system taking part in the process. In an embodiment of the present invention, the overall architecture of the test landscape remains largely intact—even in the case of several logically and/or physically separated systems.

An embodiment of the present invention provides for usage of a central component to provide all required status- and result information regarding the test status of every system in the test landscape. This central component is able to receive status- and result information from every test tool which is used in the test. This central component also is able to answer requests of every test tool used within the test regarding the status- and result information of other test tools taking part in the test.

In a further embodiment of the present invention, an extension of the capabilities of the existing test tool(s) is provided by extending the test tool(s) so that it can communicate with the central component. For example, this extension involves transmission of status—and result information to the central component, and a request of the status—and result information of other components taking part in the test.

In an embodiment, the communication for the purpose of the data exchange between the central component and the test tool may be realized by using an appropriate communications protocol.

In an embodiment, only one single instance of the central component like described above is required in each test landscape. However, the extension of the tool has to be applied to every instance of the test tool, which means one on every system involved in the test.

Figure 2:
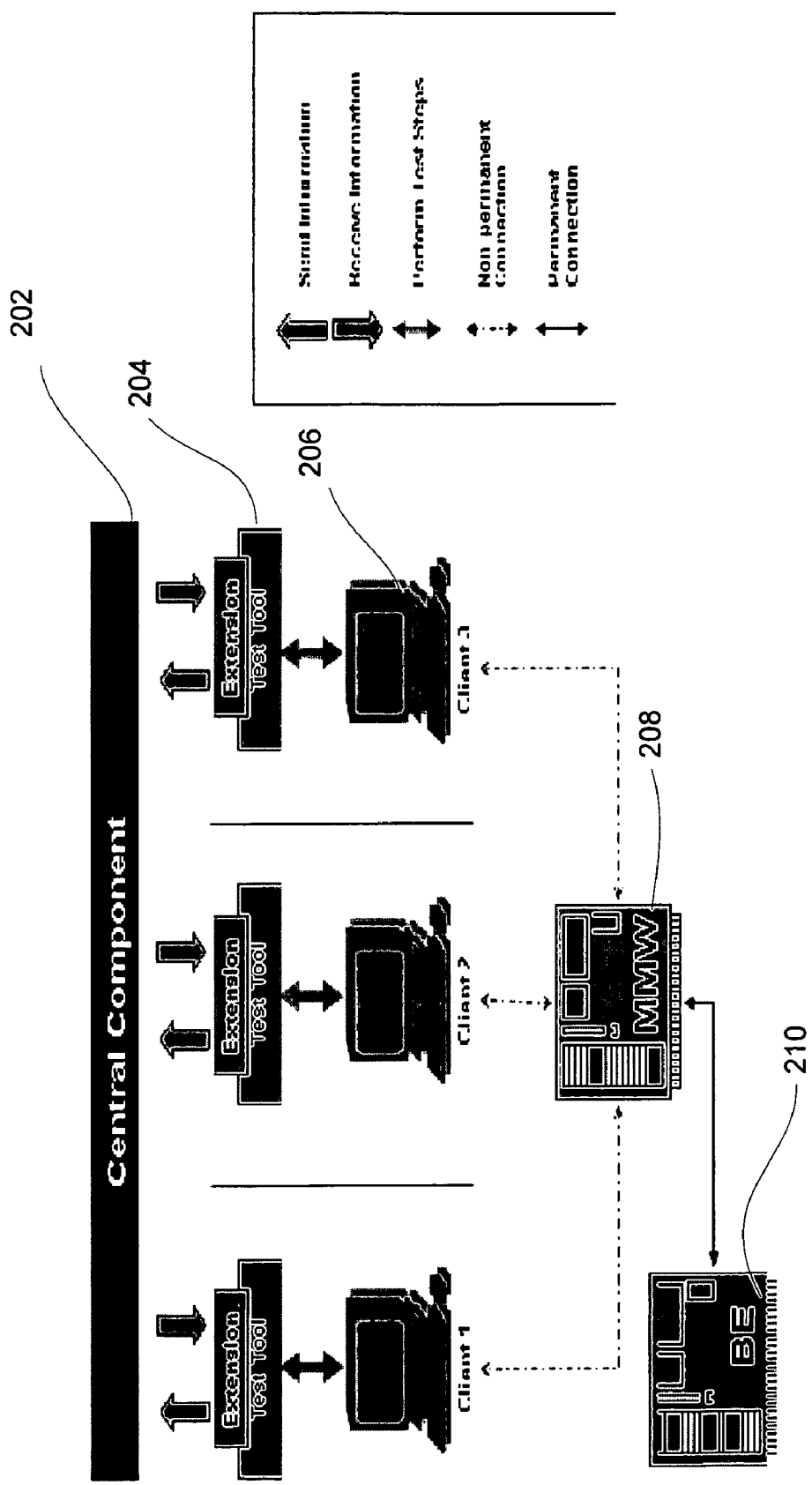
FIG. 2 shows a diagram of an embodiment according to the present invention.

FIG. 2 shows an example embodiment of the present invention. In FIG. 2, the central component 202 is shown communicating with the extension of the test tool 204 for each of client 1, client 2, and client 3 206. The extension of the test tool 204 communicates with its respective client 206. The MMW 208 is illustrated as communicating with the clients, and with the backend system 210. FIG. 3 shows an example flow chart according to the present invention. In FIG. 3, a test is executed across each of at least two separated systems 302. A central component is provided 304, and the central component receives the status and result information from all of the test tools associated with the testing of the at least two separated systems 306. The central component also answers the requests from each test tool about the status and result information provided by the other test tools involved in the testing of the at least two separated systems 308. Additional systems may be included in the testing of the systems. Not all of the systems are separate and distinct on at least one of a physical and a logical level.

In an embodiment, the central component is a stand alone executable program. The central component is executed on a system which can be reached from every system within the test by using a selected communication channel. An example selected communication channel is based on the TCP/IP (Transmission Control Protocol/Internet Protocol) protocol. In this situation, the protocol may provide for communicable unique global addressing between computers. The selected communication channel may also be based on other available protocols.

In an embodiment, an example test tool may be the Compuware Test Partner. The extension of the test tool may be realized by providing or developing a DLL (Dynamic Link Library) which can be included into the Test Partner tool to extend the existing set of functions by providing appropriate objects and methods.

In an embodiment, the communication between the central component and the test systems, a proprietary protocol based on TCP/IP is provided and uses the WinSock-Interface.

Depending upon the test tool(s) and the communication protocol used, the present invention may be realized in a variety of embodiments. In an embodiment, the central component is substituted by the storage of the information on a central file system. The submit of status—and result information may be effected by writing the information into the central file system. Accordingly, requests to the central component will be addressed in this situation when reading the information available on the central file system. In this situation, the extension of the test tool needs to support the read- and write access to the central file system.

In an embodiment, the extension of the test tool is made by using the scripting language of the test tool and/or by providing another way of coding which can be included by the test tool. In embodiments, generally, all protocols which allow for a bi-directional communication between the communication partners may be used in accordance with the present invention. Each of the alternative embodiments may be used in combination with each other and/or in combination with the other embodiments of the present invention discussed above.

Embodiments of the present invention may be used in situation(s) where the test automation of a process is required for separated physical and/or logical systems during the execution. For example, embodiments of the present invention may be useful when developing mobile solutions in conjunction with business processes.

It should be understood that there exist implementations of other variations and modifications of the invention and its various aspects, as may be readily apparent to those of ordinary skill in the art, and that the invention is not limited by specific embodiments described herein. Features and embodiments described above may be combined with and without each other. It is therefore contemplated to cover any and all modifications, variations, combinations or equivalents that fall within the scope of the basic underlying principals disclosed and claimed herein.

What is claimed is:

1. A system for testing of a business process, comprising:
a server system;
a middleware device which has a persistent connection to the server system;
a plurality of independently-executing clients, each having a non-persistent connection to the middleware device, wherein the non-persistent connection connects the clients to the middleware device during a series of synchronization time periods, each client executing business processes that include process steps that are dependent on process steps of another client, and each client executing a respective test tool, wherein the test tools, via the non-persistent connections to the middleware device during the synchronization time periods, report to the server status and result information during execution of test processes on their respective clients, the server caches the status and result information received from the test tools, and the test tools, via the non-persistent connection to the middleware device during the synchronization time periods, query the server for the status and/or result information of other test tools to clear dependencies involved in the business processes executing at the respective client.

2. The system of claim 1, wherein the at least two separated clients are at least one of logically separate and physically separate.

3. The system of claim 1, wherein the testing is an automated testing.

4. The system of claim 1, wherein the middleware device is a stand alone and mobile device.

5. The system of claim 1, wherein a communication protocol between the middleware device and the clients is based on TCP/IP protocol and uses the WinSock-Interface.

6. The system of claim 1, wherein the transfers of status values and results from a first client to a second client occur only during the synchronization time periods.

7. A method for testing a business process executed on at least two separated clients using a server, wherein the server is connected to a middleware device via a persistent connection and the at least two separated clients are connected to the middleware device via non-persistent connection during a series of synchronization time periods, the method comprising:

independently running a respective test tool across each of at least two separated clients, the running on each client executing business processes that include process steps that are dependent on process steps of another client;

receiving and caching, by the server via the non-persistent connection to the middleware device during the synchronization time periods, status and result information from a test tool associated with the respective test;

answering, by the server via the non-persistent connection to the middleware device during the synchronization time periods, a request from the test tool regarding the status and result information provided by another test tool, wherein one respective test tool is used per client in the test, the respective test tool being capable of transmitting status and result information to the server and being capable of requesting the status and result information of other clients in the test.

8. The method of claim 7, wherein the at least two separated clients are at least one of logically separate and physically separate.

9. The method of claim 7, wherein the testing is an automated testing.

10. The method of claim 7, wherein the middleware device is a stand alone and mobile device.

11. The method of claim 7, further comprising:

using a communication protocol between middleware device and the clients is based on TCP/IP protocol and uses the WinSock-Interface.

12. The method of claim 7, wherein the transfers of status values and results from a first client to a second client occur only during the synchronization time periods.

13. A computer-readable non-transitory medium stored thereon instructions adapted to execute a method for testing a business process executed on at least two separated clients using a server, wherein the server is connected to a middleware device via a persistent connection and the at least two separated clients are connected to the middleware device via non-persistent connection during a series of synchronization time periods, the method comprising:

independently running a respective test tool across each of at least two separated clients, the running on each client executing business processes that include process steps that are dependent on process steps of another client;

receiving and caching, by the server via the non-persistent connection to the middleware device during the synchronization time periods, status and result information from a test tool associated with the respective test;

answering, by the server via the non-persistent connection to the middleware device during the synchronization time periods, a request from the test tool regarding the status and result information provided by another test tool, wherein one respective test tool is used per client in the test, the respective test tool being capable of transmitting status and result information to the server, and being capable of requesting the status and result information of other clients in the test.

14. The medium of claim 13, wherein the at least two separated clients are at least one of logically separate and physically separate.

15. The medium of claim 14, wherein the testing is an automated testing.

16. The medium of claim 14, wherein the middleware device is a stand alone and mobile device.

17. The medium of claim 14, further comprising:

using a communication protocol between middleware device and the clients is based on TCP/IP protocol and uses the WinSock-Interface.

18. The medium of claim 13, wherein the transfers of status values and results from a first client to a second client occur only during the synchronization time periods.

* * * * *